United States Patent
Li et al.

(10) Patent No.: US 8,655,092 B2
(45) Date of Patent: Feb. 18, 2014

(54) WAVELET COEFFICIENT QUANTIZATION METHOD USING HUMAN VISUAL MODEL IN IMAGE COMPRESSION

(75) Inventors: Bo Li, Beijing (CN); Hai-Heng Cao, Beijing (CN); Yi-hong Wen, Beijing (CN); Hong-xu Jiang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 13/500,070

(22) PCT Filed: Dec. 16, 2010

(86) PCT No.: PCT/CN2010/079875
§ 371 (c)(1),
(2), (4) Date: Apr. 4, 2012

(87) PCT Pub. No.: WO2012/079237
PCT Pub. Date: Jun. 21, 2012

(65) Prior Publication Data
US 2013/0266237 A1  Oct. 10, 2013

(51) Int. Cl.
*G06K 9/00* (2006.01)
(52) U.S. Cl.
USPC .......................................................... 382/251
(58) Field of Classification Search
None
See application file for complete search history.

(56) References Cited

U.S. PATENT DOCUMENTS

| | | | | |
|---|---|---|---|---|
| 5,933,194 A * | 8/1999 | Kim et al. | ................... | 348/403.1 |
| 6,792,129 B1 * | 9/2004 | Zeng et al. | ................... | 382/100 |
| 7,006,568 B1 * | 2/2006 | Gu et al. | ................... | 375/240.11 |
| 2007/0274383 A1 * | 11/2007 | Yu et al. | ................... | 375/240.11 |
| 2008/0131014 A1 * | 6/2008 | Lee et al. | ................... | 382/251 |

OTHER PUBLICATIONS

Podilchuk et al., "Image-adaptive watermarking using visual models," IEEE Journal on Selected Areas in Comm., special issue on Copyright and Privacy Protection, vol. 16, No. 4, pp. 525-539, May 1998.*

* cited by examiner

*Primary Examiner* — Bhavesh Mehta
*Assistant Examiner* — Feng Niu
(74) *Attorney, Agent, or Firm* — Mark M. Friedman (57) ABSTRACT

A wavelet coefficient quantization method using a human visual model in an image compression process is provided, which is particularly suitable for remote sensing image compression. A wavelet-domain visual quantization model is obtained through experiments based on human visual characteristics, so as to reflect the relation between distortion of wavelet coefficient blocks and human visual characteristics. The model includes a luminance component, a masking component and a frequency component, where the luminance component is calculated by low frequency coefficients after the $k^{th}$ level wavelet transform, the masking component is calculated by high frequency coefficients of the second and third levels, and the frequency component is calculated by a statistical method. The method may be used in combination with any mainstream wavelet compression method such as EZW, SPIHT or EBCOT.

10 Claims, 4 Drawing Sheets

WAVELET COEFFICIENT QUANTIZATION METHOD USING HUMAN VISUAL MODEL IN IMAGE COMPRESSION

FIELD OF THE INVENTION

The present invention relates to a wavelet coefficient quantization method for using in an image compression process, and more particularly to a wavelet coefficient quantization method using human visual characteristics to improve the subjective quality of a recovered image in an image compression process, which belongs to the field of still image compression technologies.

BACKGROUND OF THE INVENTION

In recent years, wavelet transform-based image compression methods have been widely applied to still image compression. Among these methods, the most representative methods include Embedded Zerotree Wavelet (EZW), Set Partitioning In Hierarchical Trees (SPIHT), and Embedded Block Coding with Optimal Truncation (EBCOT) which is the core of the new generation still image compression standard JPEG2000, where wavelet transform has become a necessary step in the still image compression standard JPEG2000.

However, the above methods still have some defects: when the compression ratio is high, if the wavelet-based compression method is used, obvious visual distortion of a recovered image easily occurs. The reason is that human eyes, as the final receiver of images, have different sensitivities to different types of image distortion, but currently the performance of the image compression method is evaluated using a Peak Signal-to-Noise Ratio (PSNR) value or Mean Square Error (MSE), without considering this important factor.

Figure 1:
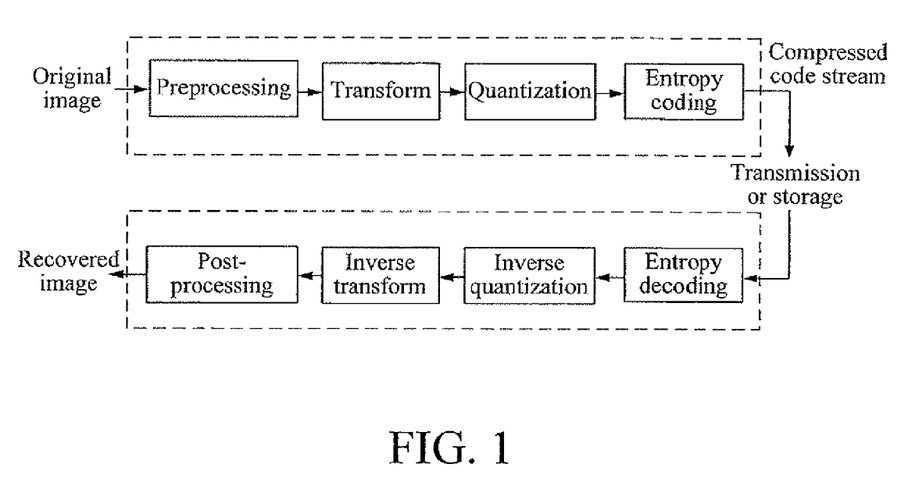
FIG. 1 is a block diagram illustrating the principle of wavelet compression/decompression in the prior art.

A block diagram illustrating the basic principle of a currently typical wavelet transform-based image compression method such as EBCOT or SPIHT is shown in FIG. 1, where the compression process includes four steps, namely, preprocessing, wavelet transform, quantization and coding. In the preprocessing stage, operations such as color space conversion and direct-current (DC) component removal are completed. Wavelet transform is used for reducing the spatial correlation of image data to compact energy into the low frequency part, so as to facilitate compression. The purpose of the quantization step is to reduce the entropy of the image data, so as to improve the overall compression ratio. Finally, the quantized wavelet coefficients are entropy coded to obtain a compressed code stream.

In the whole process of image compression and recovery shown in FIG. 1, the quantization step is the only operation causing distortion of a recovered image. In the image compression process, a good quantization scheme should be combined with human visual characteristics as far as possible, adopt different quantized values for different coefficients, discard unimportant information to which human eyes are insensitive, and maintain important information to which human eyes are sensitive, so as to ensure the quality of a recovered image while achieving compression. Existing researches indicate that human visual characteristics related to images mainly include luminance adaptation, masking effect and frequency characteristics; however, current image compression methods seldom consider human visual characteristics in the quantization stage, for example, neither SPIHT nor EZW considers human visual characteristics, and even if a few compression methods consider human visual characteristics, the consideration is not sufficient, which is mainly embodied in the following aspects.

(1) Only part of human visual characteristics are considered. For example, in the commonly used MEG 2000 standard, Fixed Visual Weighting (FVW) is to calculate a sub-band weight table which is not correlated to images but is correlated to the distance of sight (distance from human eyes to a display) according to a human visual model, directly multiply coefficients by corresponding weights after wavelet transform, and then perform regular coding. The method only uses band characteristics in human visual characteristics, and does not have an obvious effect in practical applications. Visual Progressive Coding (VIP) is to perform bit-plane scanning and coding according to a regular method, and use a weighted mean square error based on visual weights to replace a mean square error during optimized truncation, so as to minimize visual distortion in the compression process.

(2) A model obtained through visual experiments from a spatial domain image is not associated with wavelet coefficients, and thus cannot directly reflect the sensitivities of different wavelet coefficients to the human visual system. For example, the famous Dynamic Contrastive Quantization (DCQ) is to establish a contrast distortion model according to texture characteristics of an original image, and dynamically adjust the quantized value of each sub-band according to the overall contrast distortion iteratively until the visual distortion of the sub-bands are the same, so as to achieve an optimal visual effect. The algorithm cannot directly establish an association between wavelet coefficients and visual quantization values, and thus requires iterative computation, which increases the complexity and affects the practicability.

(3) Most visual models are established in unit of bands. The FVW, VIP and DCQ described above all define the visual quantization value in unit of bands, which are advantageous in that the visual quantization value has a small overhead in the code stream, but also have an obvious disadvantage of having a large granularity, failing to reflect detailed features of images.

SUMMARY OF THE INVENTION

Accordingly, the present invention is directed to a wavelet coefficient quantization method using a human visual model in image compression. The method can effectively improve the subjective quality of a recovered image, while considering factors such as accuracy of the visual model and time and space complexities of the method.

To achieve the above objectives, the present invention adopts the following technical solution.

A wavelet coefficient quantization method using a human visual model in image compression includes:

Step 1: performing wavelet transform on an image to be compressed, and partitioning all obtained sub-bands into n×n blocks, each block marked by B(j,d,i), where j represents a wavelet transform level of the sub-band where the block is located, d represents a direction of the sub-band where the block is located, and i represents a position of the block in the sub-band;

Step 2: calculating a maximal value $MAX_k$ and a minimal value $MIN_k$ of wavelet coefficients in the lowest frequency sub-band $LL_k$ after the $k^{th}$ level wavelet transform, and a mean $M(i)$ of coefficients of each block in the sub-band, then mapping the obtained mean $M(i)$ of coefficients of each block to obtain a mapped gray value $L(i)$:

$$L(i)=255\times(M(i)-MIN_k)/MAX_k-MIN_k)$$

calculating a luminance component $T_A(j,d,i)$ of the visual model according to the obtained mapped gray value $L(i)$:

$$T_A(j, d, i) = \begin{cases} w(a+b \cdot T_1)^c/\sqrt{g}, & L(i) \leq T_1 \\ w(a+b \cdot L(i))^c/\sqrt{g}, & T_1 < L(i) < T_2 \\ w(a+b \cdot T_2)^c/\sqrt{g}, & L(i) \geq T_2 \end{cases}$$

where a is a voltage when a pixel value of a Cathode Ray Tube (CRT) display is 0, b is a scale factor between a pixel value and a voltage value, c is a gamma value of the display, w is the Weber ratio, g is an energy gain factor at the $k^{th}$ level of wavelet transform, and $T_1$ and $T_2$ are respectively upper and lower thresholds of a linear region in Weber's Law;

Step 3: respectively obtaining blocks of HL and LH subbands of the image to be compressed after the second and third levels of wavelet transform, and calculating a masking component $T_M(j,d,i)$ of the visual model;

$$T_M(j, d, i) = \frac{\sqrt{C(2, HL, i) + C(3, HL, i)} + \sqrt{C(2, LH, i) + C(3, LH, i)}}{2\sqrt{2}}$$

where $C(2,HL,i)$ represents a maximal value of absolute values of coefficients in a block $B(2,HL,i)$, $C(3,HL,i)$ represents a maximal value of absolute values of coefficients in a block $B(3,HL,i)$, $C(2,LH,i)$ represents a maximal value of absolute values of coefficients in a block $B(2,LH,i)$, and $C(3,LH,i)$ represents a maximal value of absolute values of coefficients in a block $B(3,LH,i)$;

Step 4: calculating a joint component $T_G(j,d,i)$ of the obtained luminance component and masking component:

$$T_G(j,d,i) = [T_A(j,d,i)]^\alpha [T_M(j,d,i)]^\beta$$

where $\alpha$ and $\beta$ respectively represent luminance component and masking component weight values;

Step 5: quantizing the obtained joint component $T_G(j,d,i)$ according to predetermined N levels, to obtain N level values $T_{G1}$ to $T_{GN}$, and a quantized value $Q(j,d,i)$ of each joint component $T_G(j,d,i)$, and respectively coding the level values $T_{G1}$ to $T_{GN}$ and the value $Q(j,d,i)$;

Step 6: selecting multiple test images of the same size as the image to be compressed, using the wavelet transform method to obtain wavelet coefficients, and calculating a frequency component of the visual model for each band respectively in the following manner: adjusting a quantized value to quantize the band until distortion of a recovered image is just perceptible to human eyes, recording the current quantized value as a frequency Just Noticeable Differences (JND) value of the image at the band, and averaging the frequency JND values of the same bands in the multiple images to obtain a frequency component $T_S(j,d,i)$ of the visual model;

Step 7: using the obtained quantized value $Q(j,d,i)$ of the joint component $T_G(j,d,i)$ and the frequency component $T_S(j,d,i)$ of the visual model to calculate a visual quantization threshold $T(j,d,i)$:

$$T(j,d,i) = Q(j,d,i) - [T_S(j,d,i)]^\gamma$$

where $\gamma$ represents a frequency component weight value; and

Step 8: performing quantization by using the visual quantization threshold.

When the compression ratio is smaller than 8, the luminance component weight value $\alpha$, the masking component weight value $\beta$ and the frequency component weight value $\gamma$ are 0.5, 0.5 and 0.5, respectively; and when the compression ratio is between 8 and 20 the luminance component weight value $\alpha$, the masking component weight value $\beta$ and the frequency component weight value $\gamma$ are 0.5, 1.0 and 1.0, respectively.

In the present invention, a texture sensitive model is obtained through visual experiments, quantization scale factors (the visual quantization threshold) are calculated according to texture features of image blocks corresponding to different coefficient blocks, and finally wavelet coefficients are quantized. Experimental results indicate that under the same compression ratio, as compared with the still image compression standard JPEG2000, the texture-based wavelet coefficient quantization method desirably maintains texture details of the original image, thereby improving the subjective quality of recovered image. The image processing method provided in the present invention is particularly suitable for remote sensing image compression.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE PREFERRED EMBODIMENTS

A wavelet coefficient quantization step in an image compression process is carried out in wavelet domain. To reflect human visual characteristics more directly and accurately, the most ideal method is using an experimental method in psychology to calculate Just Noticeable Differences (JND) of each coefficient through repeated experiments: quantization and inverse quantization are performed on each coefficient after wavelet transform, and only when the quantized value is smaller than a threshold D, the image after inverse transform has no effect on human vision, and human eyes cannot distinguish image distortion. The threshold D is defined as a JND value of the coefficient. After the JND value of each coefficient is obtained, if the quantized value in each coefficient block during quantization can be adjusted according to a proportional relation among the JND values, the recovered image may achieve a good visual effect. This is the guiding ideology of visual quantization. However, different images have different characteristics, and if quantization is performed after the JND of each coefficient is obtained according to an experimental method, human eye judgment is required, so that the process is complex and not practicable.

In the present invention, a visual quantization model including a luminance component, a masking component and a frequency component, is established in wavelet domain by using human visual characteristics in combination with features of wavelet transform, and then a visual JND value is calculated according to the visual quantization model to serve as a visual quantization value of human visual characteristics. Considering that the luminance characteristic, the masking characteristic and the frequency characteristic are three main human visual characteristics, in the present invention, the visual quantization value is decomposed into three components, namely, the luminance component, the masking component and the frequency component, weight values of the three components are obtained through experiments, and then the components and the weight values are combined to obtain a final visual model equation. This is the basic idea of the visual quantization model provided in the present invention.

In the present invention, a human visual quantization model is established in unit of blocks for coefficients after wavelet transform of the image, a visual distortion threshold of each coefficient block is calculated according to the model, and each block is quantized according to the threshold, so as to ensure that the wavelet coefficients after quantization can effectively maintain visual information of the image, thereby achieving an optimal image visual effect after decompression.

Figure 2:
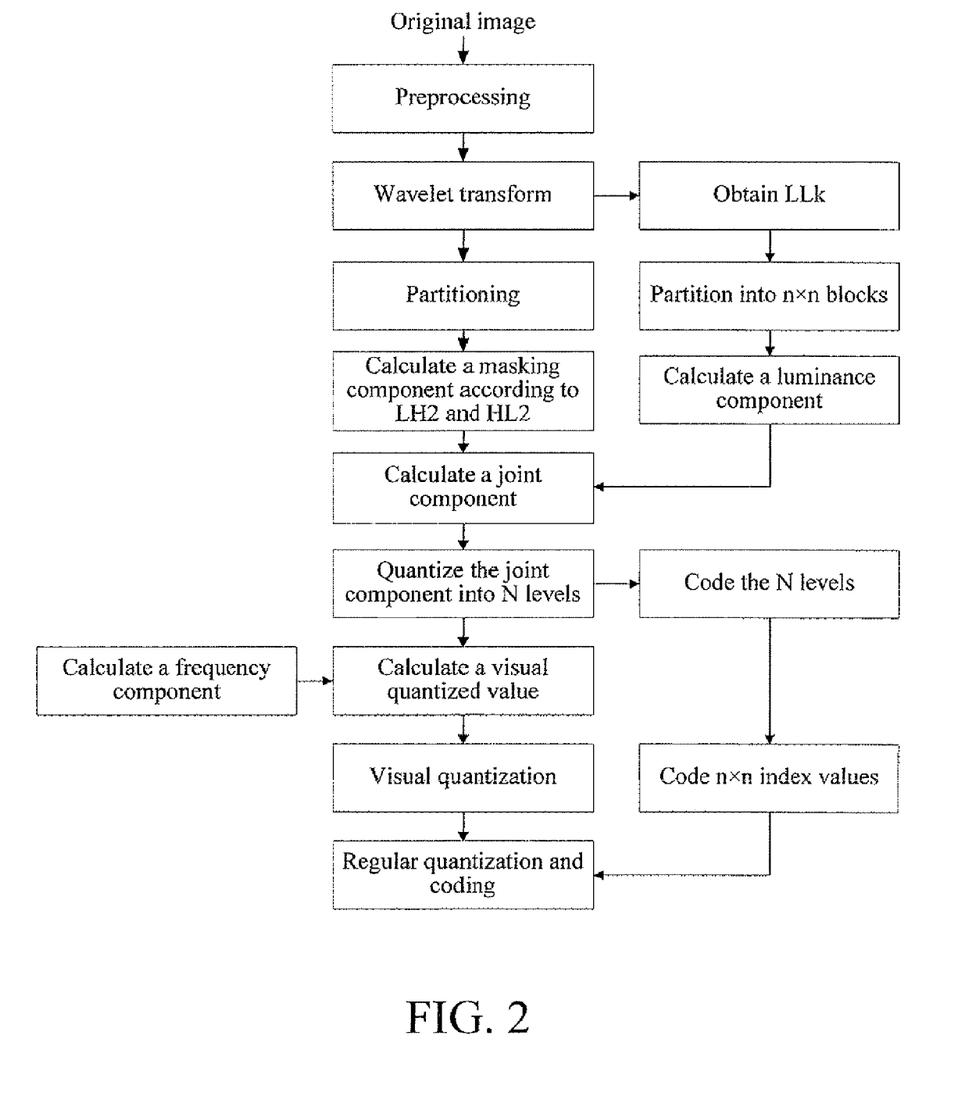
FIG. 2 is a flowchart of image compression based on a wavelet-domain visual quantization model according to the present invention.

The wavelet coefficient quantization method provided in the present invention is particularly suitable for compression of images containing rich texture details, such as remote sensing image compression. FIG. 2 is a schematic flowchart of a wavelet coefficient quantization method using a human visual model according to the present invention.

Figure 3:
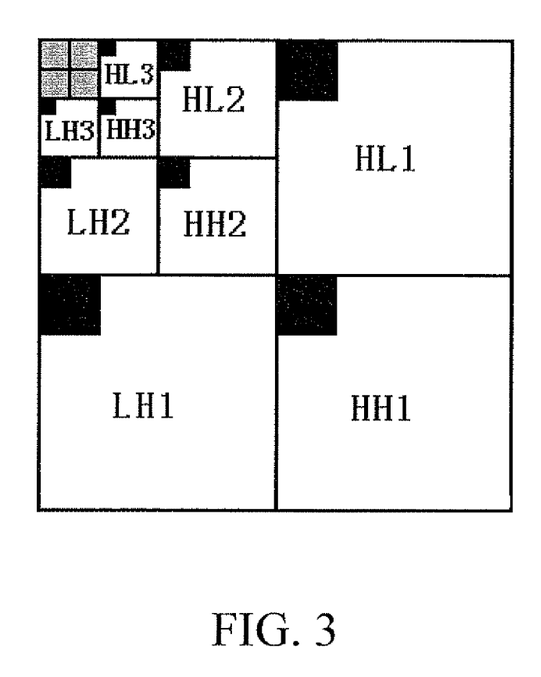
FIG. 3 is a schematic view of coefficient partitioning after wavelet transform according to the present invention.

Step 1: Partitioning wavelet coefficient. Wavelet transform is performed on an image to be compressed, to averagely partition all obtained sub-bands into n×n blocks, and each block is marked by B(j,d,i), where j represents a wavelet transform level of the sub-band where the block is located, d represents a direction of the sub-band where the block is located, and i represents a position of the block in the sub-band. If the size of blocks obtained according to the method is smaller than 2×2, the sub-band does not need to be partitioned, but instead, the entire sub-band is directly processed as a coefficient block. FIG. 3 is a schematic view illustrating the position and size of the first block (the black part in FIG. 3) of each sub-band after a 256×256 image is subjected to four levels of wavelet transform, where after the fourth level of transform, each sub-band block has a size of smaller than 2×2, and every single sub-band is taken as a block (referring to the gray part in FIG. 3).

As quantization coefficients need to be saved in a compressed code stream to facilitate inverse quantization during decompression, the scheme of calculating the visual quantization value in unit of quantization coefficients leads to too many quantized values occupying an undesirable length of the code stream, and thus is not feasible. Therefore, a better solution is to perform partitioning. In the method, different sub-bands are partitioned into blocks of different sizes, considering that wavelet coefficients have a parent-child correlation. By adopting partitioning, detailed features of the image can be maintained without significantly increasing the volume of code stream. Meanwhile, as an upper-level band block and a corresponding lower-level block have a parent-child correlation, when the luminance component and the masking component are calculated, it only needs to record the calculation result of a block of any level.

Step 2: Luminance component calculation. Image blocks with larger luminance are more tolerant to distortion, and as the luminance distribution of the image block is correlated to the distribution of low frequency coefficient blocks in the wavelet transform process, the luminance distribution of the image block may be calculated according to the distribution of low frequency coefficient blocks of any level in the wavelet transform process, so as to calculate the luminance component of each block. A maximal value $MAX_k$ and a minimal value $MIN_k$ of wavelet coefficients in a low frequency sub-band $LL_k$ after the $k^{th}$ level wavelet transform, and a mean $M(i)$ of coefficients of each block in the sub-band are calculated, the obtained mean $M(i)$ of coefficients of each block is linearly mapped based on an equation (1) to obtain a mapped gray value $L(i)$:

$$L(i) = 255 \times (M(i) - MIN_k)/(MAX_k - MIN_k) \quad (1)$$

the luminance component $T_A(j,d,i)$ of the visual model is calculated according to the obtained mapped gray value $L(i)$ by using an equation (2):

$$T_A(j,d,i) = \begin{cases} w(a + b \cdot T_1)^c/\sqrt{g}, & L(i) \leq T_1 \\ w(a + b \cdot L(i))^c/\sqrt{g}, & T_1 < L(i) < T_2 \\ w(a + b \cdot T_2)^c/\sqrt{g}, & L(i) \geq T_2 \end{cases} \quad (2)$$

where a is a voltage when a pixel value of a CRT display is 0, b is a scale factor between a pixel value and a voltage value, c is a gamma value of the display, w is the Weber ratio, g is an energy gain factor at the $k^{th}$ level of wavelet transform, and $T_1$ and $T_2$ are respectively upper and lower thresholds of a linear region in Weber's Law. Similar analysis may be used in other image devices such as a liquid crystal display (LCD) or a printer, and the only difference lies in that the gamma value is determined depending on different devices.

The lower the level of the selected low frequency sub-band is, the higher the correlation between coefficient block distribution and image block distribution is, but also the larger the data volume is. Therefore, in the process of implementing the present invention, through statistics regarding multiple images, and considering the correlation between low frequency coefficient blocks and image blocks and the computational complexity, preferably, k=2. The smaller the value of k is, the lower the correlation with the image is, and the lower the computational complexity is. A suitable value of k may be selected according to practical applications.

The coefficients in the equation (2) are preferably: a=1.77, b=0.0197, and c=2.33.

Step 3: Masking component calculation. In the wavelet transform domain, generally, human eyes are most sensitive to the second and third levels. Accordingly, in the present invention, a masking model is established by using LH and HL band data of the second and third levels of wavelet coefficients, to which human eyes are sensitive, and a masking component $T_M(j,d,i)$ of the visual model is calculated by using an equation (3):

$$T_M(j,d,i) = \frac{\sqrt{C(2,HL,i) + C(3,HL,i)} + \sqrt{C(2,LH,i) + C(3,LH,i)}}{2\sqrt{2}} \quad (3)$$

where C(2,HL,i) represents a maximal value of absolute values of coefficients in a block B(2,HL,i), C(3,HL,i) represents a maximal value of absolute values of coefficients in a block B(3,HL,i), C(2,LH,i) represents a maximal value of absolute values of coefficients in a block B(2,LH,i), and C(3,LH,i) represents a maximal value of absolute values of coefficients in a block B(3,LH,i).

Step 4: Joint component calculation. A joint component $T_G(j,d,i)$ of the obtained luminance component and masking component is calculated by using an equation (4):

$$T_G(j,d,i)=[T_A(j,d,i)]^\alpha[T_M(j,d,i)]^\beta \quad (4)$$

where $\alpha$ and $\beta$ respectively represent luminance component and masking component weight values, which represent the influence of the visual components and may be adjusted according to the environment and the compression ratio.

Step 5: Coding the joint component. It may be found through the equations (2) and (3) that, for any coefficient block, the luminance component $T_A(j,d,i)$ and the masking component $T_M(j,d,i)$ are only related to i, but are independent of j and d, and therefore, $T_G(j,d,i)$ is also only related to i, that is, all the joint components only have n×n values corresponding to i in fact. For simplifying the coding, first, the joint component $T_G(j,d,i)$ is quantized into N levels, to obtain N level values $T_{G1}$ to $T_{GN}$, and a corresponding quantized value $Q'(j,d,i)$ of each block $T_J(j,d,i)$ after quantization; and to reduce the data volume, TG1 to TGN are respectively corresponding to index values 0 to N−1. As the data is required in the decompression process, the level values TG1 to TGN and the index value corresponding to the quantized level value of each block must be coded and saved in the compressed code stream.

Figure 4:
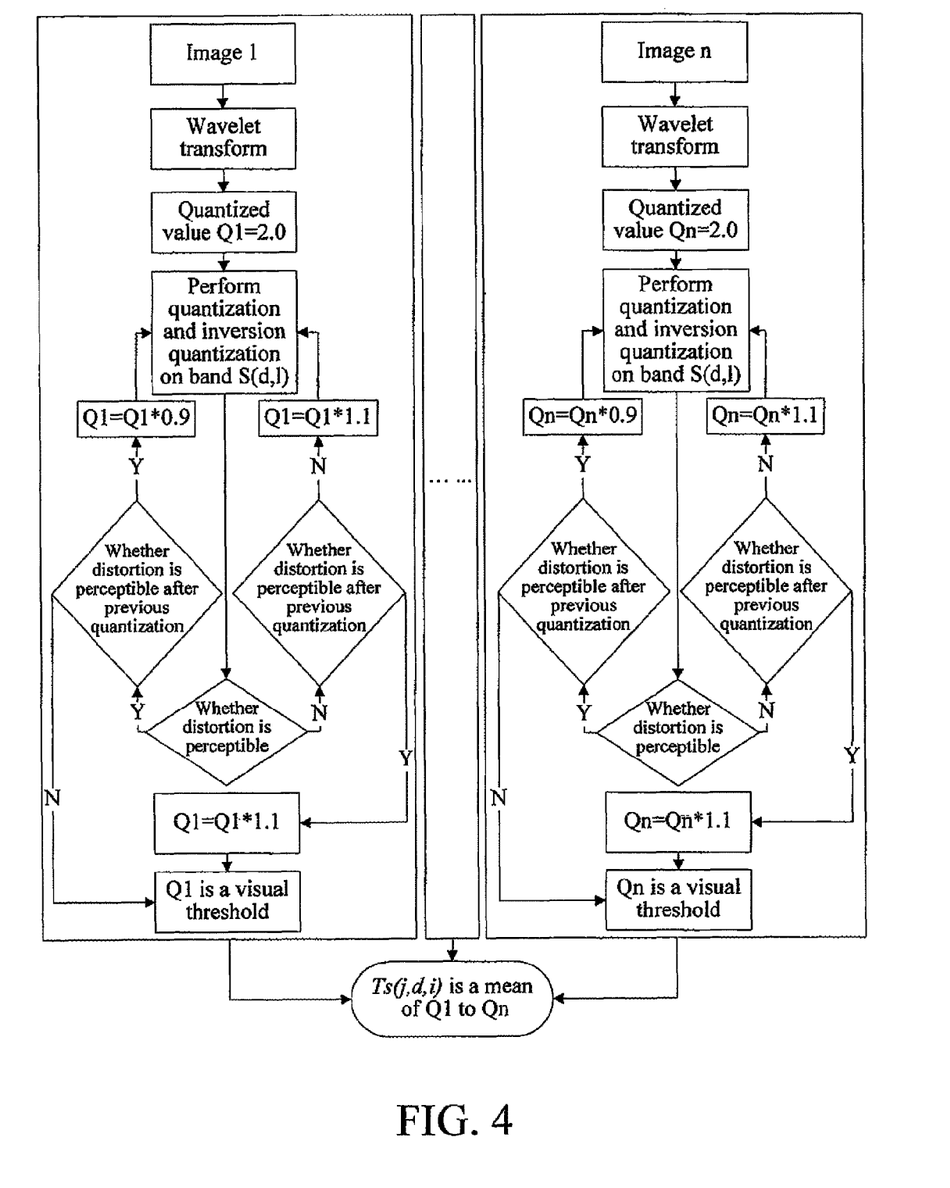
FIG. 4 is a schematic view of calculating a frequency component by an iteration method according to the present invention.

Step 6: Frequency component statistics. Frequency component calculation is independent of the specific image or wavelet coefficient to be coded, but is related to the wavelet basis used for transform, and therefore, the frequency component of a particular wavelet basis may be obtained through statistics. Referring to FIG. 4, in this embodiment, multiple test images with different complexities are selected, wavelet coefficients are obtained using the wavelet transform method, and the frequency component of the visual model is calculated for each band respectively in the following manner.

Select n images of the same size as test images to be compressed. An initial value of the quantized value is set to 2.0, then perform quantization and inverse quantization on a band. The band is repeatedly quantized by increasing or decreasing the quantized value until distortion of a recovered image is just perceptible to human eyes, and the current quantized values Q1 to Qn are recorded as frequency JND values of the images 1 to n at the band. The frequency JND values of the same bands in the multiple images are averaged to obtain the frequency component $T_S(j,d,i)$ of the visual model.

Step 7: a visual quantization threshold $T(j,d,i)$ of each block is calculated using the obtained quantized value $Q(j,d,i)$ of the joint component $T_G(j,d,i)$ and the frequency component $T_S(j,d,i)$ of the visual model, and to be calculated based on an equation (5):

$$T(j,d,i)=Q(j,d,i)\cdot[T_S(j,d,i)]^\gamma \quad (5)$$

where $\gamma$ represents a frequency component weight value. The luminance component weight value $\alpha$ varies in a range from 0.4 to 0.6, the masking component weight value $\beta$ varies in a range from 0.4 to 1.2, and the frequency component weight value $\gamma$ varies in a range from 0.4 to 1.2. When the compression ratio is smaller than 8, the luminance component weight value $\alpha$, the masking component weight value $\beta$ and the frequency component weight value $\gamma$ are preferably 0.5, 0.5 and 0.5, respectively; and when the compression ratio is 8 to 20, the luminance component weight value $\alpha$, the masking component weight value $\beta$ and the frequency component weight value $\gamma$ are preferably 0.5, 1.0 and 1.0, respectively.

Step 8: Quantization is performed using the visual quantization threshold.

The wavelet coefficient quantization method provided in the present invention may be used in combination with any mainstream wavelet compression method such as EZW, SPIHT or EBCOT. Experimental results indicate that after the quantization model provided in the present invention is introduced, texture information and small targets of the image can be maintained desirably, thereby achieving a better subjective quality than the prior art under the same compression ratio.

Finally, it should be noted that, the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A wavelet coefficient quantization method using a human visual model in image compression, comprising:

Step 1: performing wavelet transform on an image to be compressed, and partitioning all obtained sub-bands into n×n blocks, and marking each block by $B(j,d,i)$, wherein j represents a wavelet transform level of the sub-band where the block is located, d represents a direction of the sub-band where the block is located, and i represents a position of the block in the sub-band;

Step 2: calculating a maximal value $MAX_k$ and a minimal value $MIN_k$ of wavelet coefficients in the lowest frequency sub-band $LL_k$ after the $k^{th}$ level wavelet transform, and a mean $M(i)$ of coefficients of each block in the sub-band, then mapping the obtained mean $M(i)$ of coefficients of each block to obtain a mapped gray value $L(i)$:

$$L(i)=255\times(M(i)-MIN_k)/(MAX_k-MIN_k)$$

calculating a luminance component $T_A(j,d,i)$ of the visual model according to the obtained mapped gray value $L(i)$:

$$T_A(j,d,i)=\begin{cases} w(a+b\cdot T_1)^c/\sqrt{g}, & L(i)\le T_1 \\ w(a+b\cdot L(i))^c/\sqrt{g}, & T_1<L(i)<T_2 \\ w(a+b\cdot T_2)^c/\sqrt{g}, & L(i)\ge T_2 \end{cases}$$

wherein a is a voltage when a pixel value of a Cathode Ray Tube (CRT) display is 0, b is a scale factor between a pixel value and a voltage value, c is a gamma value of the display, w is the Weber ratio, g is an energy gain factor at the $k^{th}$ level of wavelet transform, and $T_1$ and $T_2$ are respectively upper and lower thresholds of a linear region in Weber's Law;

Step 3: respectively obtaining blocks of HL and LH sub-bands of the image to be compressed after the second and third levels of wavelet transform, and calculating a masking component $T_M(j,d,i)$ of the visual model;

$$T_M(j,d,i) = \frac{\sqrt{C(2,HL,i)+C(3,HL,i)} + \sqrt{C(2,LH,i)+C(3,LH,i)}}{2\sqrt{2}}$$

wherein C(2,HL,i) represents a maximal value of absolute values of coefficients in a block B(2,HL,i), C(3,HL,i) represents a maximal value of absolute values of coefficients in a block B(3,HL,i), C(2,LH,i) represents a maximal value of absolute values of coefficients in a block B(2,LH,i), and C(3,LH,i) represents a maximal value of absolute values of coefficients in a block B(3,LH,i);

Step 4: calculating a joint component $T_G(j,d,i)$ of the obtained luminance component and masking component:

$$T_G(j,d,i)=[T_A(j,d,i)]^\alpha [T_M(j,d,i)]^\beta$$

wherein α and β respectively represent luminance component and masking component weight values;

Step 5: quantizing the obtained joint component $T_G(j,d,i)$ according to predetermined N levels, to obtain N level values $T_{G1}$ to $T_{GN}$, and a quantized value Q(j,d,i) of each joint component $T_G(j,d,i)$, and respectively coding the level values $T_{G1}$ to $T_{GN}$ and the value Q(j,d,i);

Step 6: selecting multiple test images of the same size as the image to be compressed, using the wavelet transform method to obtain wavelet coefficients, and calculating a frequency component of the visual model for each an respectively in the following manner: adjusting a quantized value to quantize the band until distortion of a recovered image is just perceptible to human eyes, recording the current quantized value as a frequency Just Noticeable Differences (JND) value of the image at the band, and averaging the frequency JND values of the same bands in the multiple images to obtain a frequency component $T_S(j,d,i)$ of the visual model;

Step 7: using the obtained quantized value Q(j,d,i) of the joint component $T_G(j,d,i)$ and the frequency component $T_S(j,d,i)$ of the visual model to calculate a visual quantization threshold T(j,d,i):

$$T(j,d,i)=Q(j,d,i)\cdot[T_S(j,d,i)]^\gamma$$

wherein γ represents a frequency component weight value; and

Step 8: performing quantization using the visual quantization threshold.

2. The wavelet coefficient quantization method according to claim 1, wherein:
the coefficient k in Step 2 is preferably 2.

3. The wavelet coefficient quantization method according to claim 1, wherein:
the coefficients in the equation for calculating the luminance component in Step 2 are preferably a=1.77, b=0.0197, and c=2.33.

4. The wavelet coefficient quantization method according to claim 1, wherein:
when the compression ratio is smaller than 8, the luminance component weight value γ, the masking component weight value β and the frequency component weight value γ are 0.5, 0.5 and 0.5, respectively; and when the compression ratio is between 8 and 20, the luminance component weight value α, the masking component weight value β and the frequency component weight value γ are 0.5, 1.0 and 1.0, respectively.

5. A wavelet coefficient quantization method using a human visual model in image compression, comprising:

Step 1: performing wavelet transform on an image to be compressed, to obtain a plurality of sub-bands;

Step 2: calculating a maximal value $MAX_k$ and a minimal value $MIN_k$ of wavelet coefficients in the lowest frequency sub-band $LL_k$ after the $k^{th}$ level wavelet transform, and a mean M(i) of coefficients of each block in the sub-band, and calculating a luminance component $T_A(j,d,i)$ of the visual model based on the maximal value $MAX_k$, the minimal value $MIN_k$ and the mean M(i);

Step 3: respectively obtaining blocks of HL and LH sub-bands of the image to be compressed after wavelet transform, and calculating a masking component $T_M(j,d,i)$ of the visual model;

Step 4: calculating a joint component $T_G(j,d,i)$ of the luminance component and the masking component:

Step 5: quantizing the joint component $T_G(j,d,i)$ according to predetermined N levels, to obtain a quantized value Q(j,d,i) of each joint component $T_G(j,d,i)$;

Step 6: obtaining a frequency component $T_S(j,d,i)$ of the visual model by test;

Step 7: using the quantized value Q(j,d,i) of the joint component $T_G(j,d,i)$ and the frequency component $T_S(j,d,i)$ of the visual model to calculate a visual quantization threshold T(j,d,i):

$$T(j,d,i)=Q(j,d,i)\cdot[T_S(j,d,i)]^\gamma$$

wherein γ represents a frequency component weight value; and

Step 8: quantizing the image to be compressed using the visual quantization threshold.

6. The wavelet coefficient quantization method according to claim 5, wherein:
a method for calculating the luminance component in Step 2 is:
calculating a mapped gray value L(i) based on the maximal value $MAX_k$, the minimal value $MIN_k$ and the mean M(i);

$$L(i)=255\times(M(i)-MIN_k)/(MAX_k-MIN_k)$$

calculating the luminance component $T_A(j,d,i)$ of the visual model according to the mapped gray value L(i) based on the following equation:

$$T_A(j,d,i) = \begin{cases} w(a+b\cdot T_1)^c/\sqrt{g}, & L(i) \le T_1 \\ w(a+b\cdot L(i))^c/\sqrt{g}, & T_1 < L(i) < T_2 \\ w(a+b\cdot T_2)^c/\sqrt{g}, & L(i) \ge T_2 \end{cases}$$

wherein a is a voltage when a pixel value of a display is 0, b is a scale factor between a pixel value and a voltage value, c is a gamma value of the display, w is the Weber ratio, g is an energy gain factor at the $k^{th}$ level of wavelet transform, and $T_1$ and $T_2$ are respectively upper and lower thresholds of a linear region in Weber's Law.

7. The wavelet coefficient quantization method according to claim 5, wherein:
a method for calculating the masking component $T_M(j,d,i)$ in Step 3 is: respectively obtaining blocks of HL and LH sub-bands of the image to be compressed after the second and third levels of wavelet transform, and calculating the masking component $T_M(j,d,i)$ of the visual model based on the following equation:

$$T_M(j,d,i) = \frac{\sqrt{C(2,HL,i)+C(3,HL,i)} + \sqrt{C(2,LH,i)+C(3,LH,i)}}{2\sqrt{2}}$$

wherein C(2,HL,i) represents a maximal value of absolute values of coefficients in a block B(2,HL,i), C(3,HL,i) represents a maximal value of absolute values of coefficients in a block B(3,HL,i), C(2,LH,i) represents a maximal value of absolute values of coefficients in a block B(2,LH,i), and C(3,LH,i) represents a maximal value of absolute values of coefficients in a block B(3,LH,i).

8. The wavelet coefficient quantization method according to claim 5, wherein:
an equation for calculating the joint component $T_G(j,d,i)$ in Step 4 is:

$$T_G(j,d,i) = [T_A(j,d,i)]^\alpha [T_M(j,d,i)]^\beta$$

wherein α and β respectively represent luminance component and masking component weight values.

9. The wavelet coefficient quantization method according to claim 8, wherein:
when the compression ratio is smaller than 8, the luminance component weight value α, the masking component weight value β and the frequency component weight value γ are 0.5, 0.5 and 0.5, respectively; and when the compression ratio is between 8 and 20, the luminance component weight value α, the masking component weight value β and the frequency component weight value γ are 0.5, 1.0 and 1.0, respectively.

10. A wavelet coefficient quantization method using a human visual model in image compression, comprising:
Step 1: performing wavelet transform on an image to be compressed, to obtain a plurality of coefficient blocks;
Step 2: calculating a luminance component according to wavelet coefficients in a low frequency sub-band after the $k^{th}$ level wavelet transform;
Step 3: calculating a masking component according to blocks of HL and LH sub-bands of the image to be compressed after wavelet transform;
Step 4: obtaining a frequency component by test;
Step 5: calculating a visual quantization threshold according to the luminance component, the masking component and the frequency component; and
Step 6: quantizing the image to be compressed using the visual quantization threshold.

* * * * *

UNITED STATES PATENT AND TRADEMARK OFFICE
CERTIFICATE OF CORRECTION

PATENT NO. : 8,655,092 B2  
APPLICATION NO. : 13/500070  
DATED : February 18, 2014  
INVENTOR(S) : Bo Li et al.

Page 1 of 1

It is certified that error appears in the above-identified patent and that said Letters Patent is hereby corrected as shown below:

In the Claims:

Column 9:

Claim 4 line 59 should be corrected as follows:

Change:
-- nance component weight value $\gamma$, the masking compo --
to
"nance component weight value $\alpha$, the masking compo"

Signed and Sealed this  
Sixth Day of May, 2014

Michelle K. Lee  
*Deputy Director of the United States Patent and Trademark Office*